Figure 1:
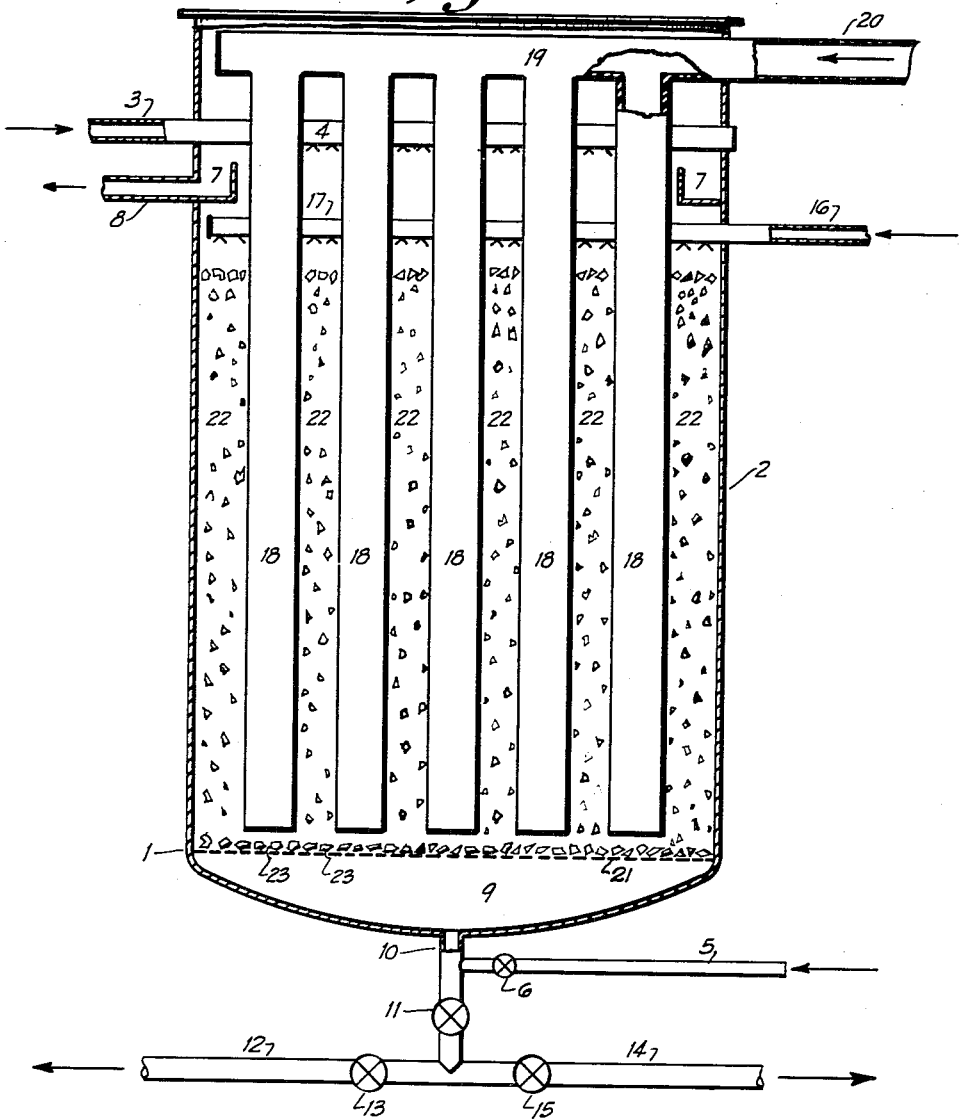

INVENTORS
HARRY L. COONRADT
WILBUR K. LEAMAN
BY Francis J. Johnston
AGENT

United States Patent Office 2,754,262
Patented July 10, 1956

2,754,262

HORIZONTALLY EXPANDING ION-EXCHANGE BED

Harry L. Coonradt, Woodbury, and Wilbur K. Leaman, Pitman, N. J., assignors to Socony Mobil Oil Company, Inc., a corporation of New York Application April 25, 1952, Serial No. 284,415

4 Claims. (Cl. 210—24)

The present invention relates to the use of ion-exchange resins and, more particularly, to the use of ion-exchange resins under conditions which result in appreciable loss of resin by fracture.

Initially, ion-exchange was used primarily in softening water employing mineral ion-exchange materials. For example, ions that cause hardness in water such as calcium and magnesium were replaced by an equivalent concentration of sodium ions. Subsequently, a number of resins were developed which are useful in the de-ionization of water and the separation or recovery of many ionic materials from aqueous solutions. In addition to the adaptation of resins to ion-exchange in aqueous solution it has been discovered that these resins can be used to remove ionic materials from organic fluids such as petroleum fractions.

These subsequent applications of ion-exchange resins have had to depend for their practical operations upon the experience and equipment developed for and used in the older applications. Consequently, when new problems are encountered peculiar to the new use, the old art does not provide the solutions. Thus, for example, in the old operation of softening water, the change in the pH of the resin and its environment is insignificant. On the other hand, in the de-ionizing of water, the pH of the resin and of its environment may change from acid to base and back to acid during the treating, backwashing and regenerating cycle. Such a change in pH of the resin and/or its environment causes the resin ion-exchange material to swell and contract.

Similarly, during the cycle in which an organic fluid is contacted with an ion-exchange resin, backwashed and regenerated with an aqueous solution the resin also may expand and contract. In fact, it is known that while some ion-exchange materials will expand about 10 per cent under such conditions as a marked change in pH of the resin and/or its environment or successive contact with organic liquids and aqueous solutions other ion-exchange resins under similar conditions will expand and contract more than 100 per cent.

It is also known that under such conditions there is an uneconomic loss of ion-exchange resin due to fracture and floating off of the fines produced in the present equipment designed in accordance with the prior art principles of the older techniques.

In general, the ion-exchange equipment presently employed is simply a tank of such size as to provide an ion-exchange material bed of sufficient depth to obtain the required degree of contact necessary to attain practical extraction by the ion-exchange resin of the ion or compound to be removed from the liquid being treated and also to provide sufficient "free-board" above the bed of ion-exchange material to permit expansion of the bed during backwash. It has been general practice to provide beds of from two to six feet in depth, shallower beds being too thin to provide the degree of contact necessary to practical operation.

In uses wherein the expansion and contraction of the particles of resin is at a minimum, loss due to fracture is not so great as to seriously affect the economics of the operation. On the other hand, in operations involving marked change of pH or alternate contact with organic and aqueous media, the loss due to fracture and floating off of the fines from the bed is great.

The fracturing of the particles of resin is due to causes which are not definitely known. However, it has now been discovered that loss of resin through fracturing can be reduced as much as 40 per cent by reducing the compression upon the resin particles through reducing the depth of the bed about 60 per cent. Accordingly, it is an object of the present invention to provide a method using ion-exchange resins wherein the loss of resin due to fracture is reduced to a practical minimum. It is another object of the present invention to provide a means for contacting ion-exchange resins with liquid media to be treated in which the loss of resins due to the formation of fines will be reduced to a practical minimum. It is a further object of the present invention to provide a means for contacting ion-exchange resin with liquid media in which compression of the resin particles is reduced to a practical minimum. Other objects and advantages will become apparent from the following description taken in conjunction with the drawing which is a more or less diagrammatic illustration, at least partly in section, of an apparatus for conducting contact of fluid media with an ion-exchange resin.

In general, the present invention provides a means for contacting a fluid medium from which an ion or a compound is to be extracted by an ion-exchange resin in which the compression of the particles of resin is reduced to a practical minimum, provision for expansion of the individual particles is made and efficient extraction can be achieved.

As has been emphasized hereinbefore, beds of ion-exchange resin are in many uses subjected to wide changes in pH. Thus, for example, a resin of the weakly acidic type, i. e., in which the functional groups are carboxylic groups, when used to extract a cation at the inception of the extraction step is acid. During the extraction step, the pH of the resin increases. For example, such a resin may swell approximately 50 per cent on transformation from the hydrogen to the sodium form. Particle swelling increases with increasing pH and at pH of about 10, resin expansion is about 100 per cent. This change is reversible. Similarly, a basic resin, when used to extract an anion, passes from a basic form during which there is an increase in volume of each resin particle of about 5 per cent or more. Similarly, an anion-exchange resin in the hydroxyl form expands more than 50 per cent when liquid medium is changed from a gasoline to water. During the regeneration cycle there is a corresponding contraction. Accordingly, the present invention provides for means whereby the compression of the superposed resin particle is reduced to a minimum concomitant with practical design.

It is well known that a minimum bed depth is required to achieve practical extraction. This minimum bed depth varies with the material to be adsorbed and with the resin employed and is usually not less than about two feet, and quite often is much more. The present invention provides for employing a bed of the necessary depth and compensating for the change in volume of the resin particles and thus the change in volume of the bed of resin particles by compensating for expansion of the bed at least in part by absorption of at least 10 per cent of the expansion in a horizontal direction.

The prior art contactors being generally simple tanks, all expansion is in a vertical direction against the compressive forces exerted by the superposed layers of resin.

In accordance with the present invention, provision is made to intersperse through the resin bed a plurality of resilient columns which are sufficiently resilient to contract sufficiently to compensate for at least 10 per cent of the expansion of the resin.

The flexible columns can be either hollow columns of a natural or synthetic elastomer under fluid pressure or solid columns of a natural or synthetic elastomer. With either column at the beginning of the treating cycle, which comprises contacting the resin with the liquid to be treated, until the resin is exhausted, backwashing the resin and contacting the resin with a regenerating solution, the flexible columns assume the maximum volume. During expansion of the resin, the flexible columns contract as the resin particles expand. During contraction of the resin particles, the flexible columns expand to assume the original volume.

Referring now to the drawings in which Figure 1 is a vertical section of an apparatus suitable for ion-exchange with horizontal expansion of the resin bed to at least 10 per cent of the total expansion of the resin bed, contactor 1, which can be circular or rectangular in cross-section although it is preferred that it be circular in cross-section, comprises a shell 2, an inlet 3 for liquid to be treated connected to a distributor 4, an inlet 5 under control of valve 6 through which backwash liquid is introduced into the contactor, an overflow trough 7 in which the backwash liquid is gathered and from which the backwash liquid is removed through one or more lines 8, a section 9 into which the treated liquid drains and from which the extracted or treated liquid drains, a drain line 10 regulated by valve 11 through which the liquid in section 9 is drawn to pass through line 12 regulated by valve 13 or line 14 regulated by valve 15, an inlet 16 and distributor 17 for regenerating solution and a plurality of flexible hollow cylinders 18 of natural or artificial elastomer so constructed and arranged as to provide for at least 10 and preferably about 25 to 90 per cent of the expansion of the resin bed. When desirable, the flexible hollow cylinders can be constructed and arranged to absorb 100 per cent of the expansion of the resin bed. Hollow flexible cylinders 18 are attached in a fluid-tight manner to manifold 19 into which a fluid is introduced through line 20. The contactor 1 is also provided with a foraminous plate 21 upon which the bed of resin particles 22 rests. Plate 21 is provided with orifices 23 through which the liquids pass. However, orifices 23 are of such diameter that the resin particles do not pass therethrough. Since the resin particles presently available are 100 per cent minus 20-mesh and 100 per cent plus 60-mesh, orifices 23 will have a diameter not less than about 0.0082 inch (0.208 mm.), and not greater than about 0.0116 inch (0.295 mm.). A graded bed of non-reactive material has also been used for the latter purpose of supporting the resin.

In the operation of the contactor, the hollow resilient cylinders are suspended in any suitable manner in contactor 1 and fluid, preferably air, introduced into the cylinders through line 20 and manifold 19. The fluid, air for example, under a pressure of about 1 to 50 p. s. i. g. and preferably about 1 to 5 p. s. i. g. is passed into the hollow resilient cylinders until the cylinders are inflated. The fresh or regenerated resin is then packed loosely about the inflated cylinders while maintaining the fluid in the hollow resilient cylinders under the pressure of about 1 to about 50 p. s. i. g., and preferably 1 to 5 p. s. i. g. The liquid to be treated is then introduced into the contactor through line 3 and distributor 4 which is constructed and arranged to distribute the liquid over substantially the total upper surface of the resin bed. Distributor 4 can be in the form of a plurality of conduits radially extending from a central hub but centered on the vertical axis of the contactor.

When the liquid to be treated is introduced into the contactor valve 6 is closed, valves 11 and 13 are opened and valve 15 closed so that the extracted liquid is carried to subsequent treating operations or to storage or the like. When the resin is exhausted, the introduction of liquid to be treated is discontinued. The liquid still in the resin bed is forced out by the liquid used in the succeeding step, and the resin backwashed with a suitable liquid by closing valve 11 and opening valve 6. Backwash liquid flows into the contactor through line 5 under sufficient pressure to cause the backwash liquid to rise through the resin bed and overflow into trough 7 from which it is removed by one or more lines 8.

After the backwash, the regenerating solution is introduced into the contactor through line 16 and distributor 17 which can be of the same design as distributor 4 or any suitable design to ensure that the regenerating solution reaches all particles of the resin bed. After the regeneration, the bed is ready for another cycle.

When the particles of resin expand, which can occur in either the extraction stage or the regeneration stage of the cycle, dependent on the type of exchanger and the material being treated, the resilient columns do offer so little resistance to the expansion of the bed that fracture due to compression is reduced in proportion to the amount of expansion which takes place in a horizontal direction. Thus, in the absence of resilient columns, all expansion of the bed must take place in a vertical direction. On the other hand, in the presence of the resilient columns, expansion can take place in a horizontal direction because the resilient columns contract as the resin particles and resin bed expand.

For example, it is known that one resin expands as much as 100 per cent during one stage of the cycle and contracts an equivalent amount during another stage of the cycle. When using such a resin in a bed 6 feet deep having an area of 10 square feet, the total volume for purposes of calculation can be considered to be 60 cubic feet. The expansion will be 60 cubic feet. In accordance with the principles of the present invention, the resilient cylinders will be of sufficient volume to permit contraction to the extent of at least 6 cubic feet or preferably to the extent of about 45 cubic feet or when desirable to the extent of 60 cubic feet. Assuming the desirability of absorbing 10 per cent of the expansion of the resin bed in the resilient cylinders, the total volume of the cylinders within the resin bed will be of the order of 10 cubic feet. On the other hand, when it is desirable to absorb all of the expansion of the resin bed in the contraction of the resilient cylinders, the total volume of the cylinders should be about 65 cubic feet. Under such conditions, the expansion of the resin bed in a vertical direction can be reduced to a minimum, and the loss of resin due to fracture resulting from the compression of the resin bed reduced to a minimum.

Figure 2:
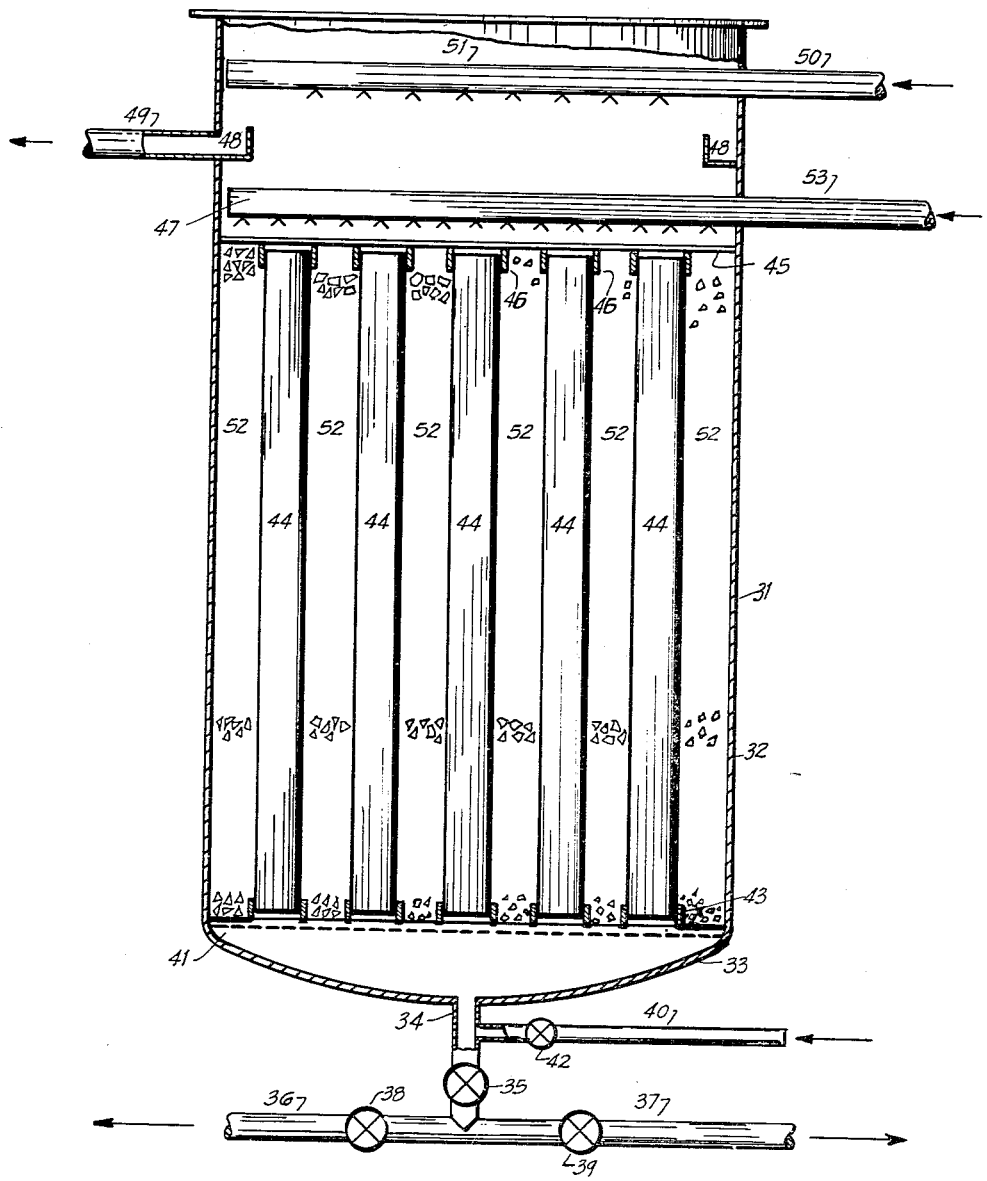

The same horizontal as distinguished from vertical expansion can be obtained in the apparatus illustrated in Figure 2. A contactor 31 which may be of circular or rectangular cross-section comprises a shell 32, having an elliptical or circular bottom 33 to which is attached a drain line 34 regulated by valve 35. Drain 34 discharges to lines 36 and 37 regulated by valves 38 and 39 respectively. Backwash liquid is introduced into shell 32 through line 40 regulated by valve 42.

Shell 32 is also provided with a foraminous plate 41, the orifices of which are small enough to retain 60-mesh particles or a graded bed of material capable of supporting and retaining the resin. Integral with plate 41, or mounted in any other suitable manner, are cups 43 into which resilient cylinders 44 snugly fit. Shell 32 is also provided with a second plate 45 or suitable means for centering caps 46 over cups 43 so that cylinders 44 are held upright between cups 43 and caps 46. A separate plate 45 can be omitted and the caps 46 carried on the under surface of distributor 47 of regenerating solution.

Shell 32 is also provided with a trough 48 and one or more lines 49 whereby trough 48 can be drained. The contactor 31 is also provided with an inlet 50 for liquid to be extracted or treated by means of which the liquid to be extracted flows into distributor 51 and is delivered to substantially the entire upper surface of the resin bed 52.

In operation, the resilient columns of a sponge-like structure and made from natural or artificial elastomer are placed in cups 43, caps 46 placed on the columns and active resin packed loosely within shell 32 on plate 41 and around columns 44. Liquid to be extracted is introduced into distributor 51 through line 50 from a source not shown, distributed over the surface of the bed, percolates therethrough, passes plate 41, collects in section 33 of shell 32 and is drained therefrom continuously or intermittently through drain 34 with valves 35 and 37 open, valve 42 closed and valve 38 closed.

When the resin becomes exhausted, the supply to the contactor is cut off, valve 35 closed, valve 42 opened and backwash liquid introduced into the contactor through line 40 under sufficient pressure to cause the backwash liquid to rise through the resin bed and overflow into trough 48 from which it is removed by one or more lines 49.

After the backwash, regenerating solution is introduced from a source not shown into distributor 47 through line 53. The regenerating solution is withdrawn from contactor 31 through drain 34 with valves 42 and 37 closed and valves 35 and 38 open. The resin is then ready for another cycle.

Distributors 47 and 51 can be of any suitable design whereby the liquid issuing therefrom reaches all of the particles of the resin bed. A satisfactory form is that of conduits running radially from a circular hub centered on the vertical axis of the contactor.

Therefore, according to the principles of the present invention, a liquid to be extracted is contacted in a confined zone with an ion-exchange bed more than 12 inches in depth in which resilient cylinders are inserted. Said flexible cylinders being capable of contraction in volume of at least 1 per cent to 10 per cent of the volume of the resin bed and preferably about 7.5 to about 100 per cent of the volume of said resin bed without collapsing.

We claim:

1. An apparatus for contacting liquids with ion-exchange resin under conditions such that the particles of ion-exchange resin alternately contract and expand which comprises a vertical conduit, a support for an ion-exchange resin within said conduit in the region of the lower end thereof constructed and arranged to retain said ion-exchange resin and to pass liquid, a plurality of spaced-apart cups mounted in said conduit above and contiguous to the aforesaid resin support, each cup being adapted to receive one end of a substantially cylindrical column in a fluid-tight manner, a horizontal member spaced apart from said resin support, a plurality of spaced-apart caps mounted on said horizontal member, each cap being specially matched to a cup contiguous to said resin support and each cap being adapted to receive the other end of a substantially cylindrical column in a fluid-tight manner, a non-metallic resilient substantially cylindrical, substantially impermeable member interposed between each matched cup and cap, means located in the upper end of said vertical column more than 12 inches from the aforesaid support for ion-exchange resin particles for introducing liquid to be contacted into said conduit and spreading liquid to be contacted over the upper surface of a bed of particles of ion-exchange resin positioned on the aforesaid support therefor, means located in the upper end of said vertical conduit more than 12 inches from the aforesaid support for ion-exchange resin particles for introducing resin regenerating liquid into said conduit and spreading regenerating liquid over the upper surface of a bed of particles of ion-exchange resin positioned on the aforesaid support therefor, means located below the aforesaid support for particles of ion-exchange resin for introducing backwash liquid into said conduit, means for removing contacted liquid and regenerating liquid, and means located in the upper region of said vertical conduit intermediate said means for introducing regenerating liquid and said means for introducing liquid to be contacted for removing backwash liquid.

2. An apparatus for contacting liquids with ion-exchange resins under conditions such that the particles of ion-exchange resin alternately contract and expand, which comprises a vertical conduit, a support for particles of ion-exchange resin within said conduit in the region of the lower end thereof constructed and arranged to retain particles of ion exchange resin and to pass liquid, a horizontally mounted conduit within said vertical conduit vertically spaced from the aforesaid support for particles of ion-exchange resin, a plurality of spaced apart outlets on the surface of said horizontally mounted conduit opposite the aforesaid support for particles of ion-exchange resin, a plurality of spaced-apart hollow resilient substantially impermeable columns closed at the lower end mounted in a fluid tight manner on each of the aforesaid spaced apart outlets and extending downwardly to the region of the aforesaid support for particles of ion-exchange resin, said columns being constructed and arranged to receive fluid from said horizontally mounted conduit, said hollow resilient columns having the longer axis of each substantially parallel to the longer axis of said conduit, means for introducing fluid under pressure into said horizontally mounted conduit and said hollow resilient columns, means mounted in the upper end of said conduit and vertically spaced from the aforesaid support for particles of ion-exchange resin for introducing liquid to be contacted into said vertical conduit and spreading said liquid to be contacted over the upper surface of a bed of particles of ion-exchange resin positioned on the aforesaid support therefor, means mounted in the upper end of said vertical column and vertically spaced from the aforesaid support for particles of ion-exchange resin for introducing regenerating liquid into said vertical conduit and spreading said regenerating liquid over the upper surface of a bed of particles of ion-exchange resin positioned on the aforesaid support therefor, means mounted below the aforesaid support for particles of ion-exchange resin for removing contacted liquid, means mounted below the aforesaid support for particles of ion-exchange resin for removing regenerating liquid and introducing backwash liquid, and means mounted intermediate said means for introducing liquid to be contacted and said means for introducing regenerating liquid for removing backwash liquid.

3. In an apparatus for contacting liquids with ion-exchange resins under conditions such that the particles of ion-exchange resin alternately contract and expand which comprises a vertical conduit, a resin support for particles of ion-exchange resin within said conduit in the region of the lower end of said conduit constructed and arranged to retain said resin particles and to pass liquid, means vertically spaced above said resin support constructed and arranged to introduce liquid to be contacted into said conduit and to spread said liquid to be contacted over the upper surface of a bed of particles of ion-exchange resin positioned on said resin support, means vertically spaced above said resin support constructed and arranged to introduce regenerating liquid into said conduit and to spread said regenerating liquid over the upper surface of a bed of particles of ion-exchange resin positioned on said resin support, means vertically spaced below said resin support constructed and arranged for the withdrawal of contact liquid from said conduit, and means vertically spaced below said resin support constructed and arranged for the withdrawal of regenerating liquid from said conduit, the improvement which comprises a plurality of spaced apart, non-metallic substantially impermeable resilient columns within said vertical conduit having the longer axis of said resilient columns substantially parallel to the longer axis of said vertical conduit, having the lower ends thereof contiguous to the aforesaid resin support, and extending upwardly from said resin support at least to the surface of said bed of particles of ion-exchange resin positioned on said resin support, said columns being constructed and arranged to provide for lateral expansion and contraction of particles of ion-exchange resin when said conduit is in use for contacting liquids with ion-exchange resins under conditions such that particles of ion-exchange resins alternately expand and contract.

4. In an apparatus for contacting liquids with ion-exchange resins as described and set forth in claim 3, a plurality of non-metallic resilient columns, the total volume of which is at least greater than 10 per cent to about 100 per cent of the unoccupied volume of said conduit between the resin support and the means for distributing liquid in said conduit.

References Cited in the file of this patent

UNITED STATES PATENTS

| Number | Name | Date |
|---|---|---|
| 171,055 | Sinclaire | Dec. 14, 1875 |
| 183,599 | Sinclaire | Oct. 24, 1876 |
| 718,358 | Kneuper | Jan. 13, 1903 |
| 1,677,891 | Green | July 24, 1928 |
| 1,688,915 | Astrom | Oct. 23, 1928 |
| 1,692,592 | Stickney | Nov. 20, 1928 |
| 1,903,958 | Clark | Apr. 18, 1933 |
| 1,935,458 | Pick | Nov. 14, 1933 |
| 1,951,917 | Leslie | Mar. 20, 1934 |
| 1,958,176 | Zimmerman | May 8, 1934 |
| 2,071,996 | Baldwin | Feb. 23, 1937 |
| 2,087,157 | Lind | July 13, 1937 |
| 2,108,087 | Thayer | Feb. 15, 1938 |
| 2,504,816 | De Ville | Apr. 18, 1950 |
| 2,600,103 | Feck | June 10, 1952 |